US006453463B1

(12) United States Patent
Chaudhry et al.

(10) Patent No.: US 6,453,463 B1
(45) Date of Patent: Sep. 17, 2002

(54) METHOD AND APPARATUS FOR PROVIDING FINER MARKING GRANULARITY FOR FIELDS WITHIN OBJECTS

(75) Inventors: Shailender Chaudhry, San Francisco; Marc Tremblay, Menlo Park, both of CA (US)

(73) Assignee: Sun Microsystems, Inc.

(*) Notice: Subject to any disclaimer, the term of this patent is extended or adjusted under 35 U.S.C. 154(b) by 0 days.

(21) Appl. No.: 09/327,397

(22) Filed: Jun. 7, 1999

(51) Int. Cl.[7] .............................................. G06F 9/446
(52) U.S. Cl. ...................................................... 717/127
(58) Field of Search .............................. 717/1, 11, 158, 717/173, 200, 127; 711/158, 173, 200

(56) References Cited

U.S. PATENT DOCUMENTS

| | | | |
|---|---|---|---|
| 5,692,169 A | | 11/1997 | Kathail et al. .............. 395/591 |
| 5,799,179 A | | 8/1998 | Ebcioglu et al. ............ 395/392 |
| 5,805,879 A | * | 9/1998 | Hervin et al. ............... 395/591 |
| 5,864,692 A | * | 1/1999 | Faraboschi et al. ......... 395/392 |
| 5,864,697 A | * | 1/1999 | Shiell .......................... 395/587 |
| 6,112,019 A | * | 8/2000 | Chamdani et al. .......... 395/390 |
| 6,122,638 A | * | 9/2000 | Huber et al. ................. 707/103 |
| 6,151,669 A | * | 11/2000 | Huck et al. .................. 712/222 |
| 6,212,539 B1 | * | 4/2001 | Huck et al. .................. 708/495 |
| 6,243,715 B1 | * | 6/2001 | Bogantz et al. ............. 707/201 |
| 6,247,027 B1 | * | 6/2001 | Chaudhry et al. ........... 707/206 |

FOREIGN PATENT DOCUMENTS

EP 0 285 310 3/1988

OTHER PUBLICATIONS

Attiya et al. Shared Memory Consistency Conditions for Non–Sequential Execution: Definitions and Programming Strategies. ACM. pp. 241–250. 1993.*

Theobald et al. Speculative Execution and Branch Prediction and Parallel Machines. ACM. pp. 77–86. 1993.*

IBM Technical Disclosure. Technique to Improve Context Switching Perfomance in a CPU. 1990. pp. 472–473.*

Chen, et al.; "Exploiting Method–Level Parallelism in Single–Threaded Java Programs"; Proceedings of PACT'98; Oct. 12–18, 1998; Paris, France; 9 pages.

Gopal, et al. .; "Speculative Versioning Cache"; To appear in the Fourth International Symposium on High–Performance Computer Architecture; pp. 1–11.

IBM Technical Disclosure Bulletin entitled "Live/Dead Tags On Computer Registers", vol. 25, No. 3A, Aug. 1982.

* cited by examiner

Primary Examiner—Gregory Morse
Assistant Examiner—Wei Zhen
(74) Attorney, Agent, or Firm—Park, Vaughan & Fleming LLP

(57) ABSTRACT

One embodiment of the present invention provides a system that facilitates marking of objects defined within an object-oriented programming system to keep track of accesses to fields within the objects. The system operates by receiving a reference to a field within an object, and identifying a marking bit within the object that is associated with the field. Note that each marking bit within the object is associated with a different subset of fields within the object. Next, the system sets the marking bit to indicate that at least one field within the associated subset of fields has been referenced. Finally, the system performs the reference to the field. In one embodiment of the present invention, the object includes N marking bits numbered 0, 1, 2, . . . , N−1 and M fields numbered 0, 1, 2, . . . , M−1. In this embodiment, the system identifies the marking bit associated with the field by starting with a field number for the field, and applying a modulo N operation to the field number to produce a number for the associated marking bit. In a variation on this embodiment, N is a power of two.

22 Claims, 7 Drawing Sheets

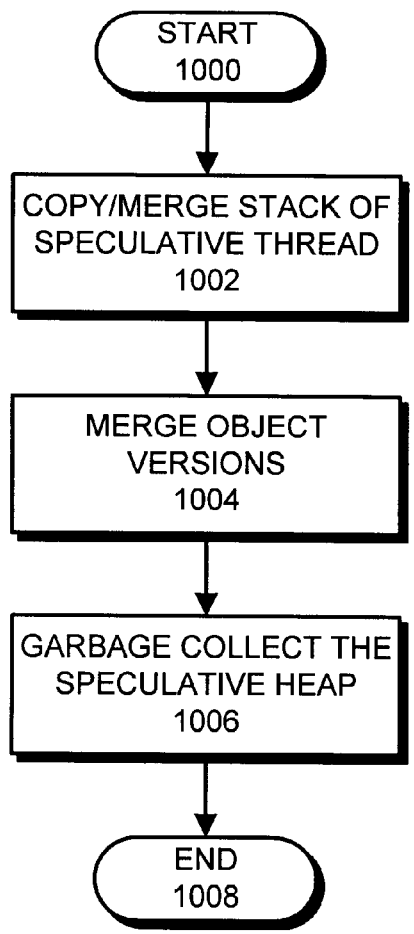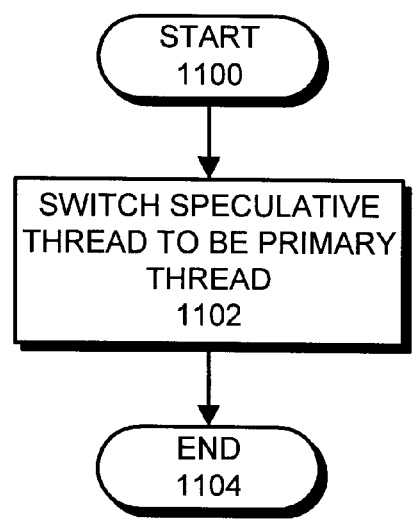
FIG. 10
FIG. 11

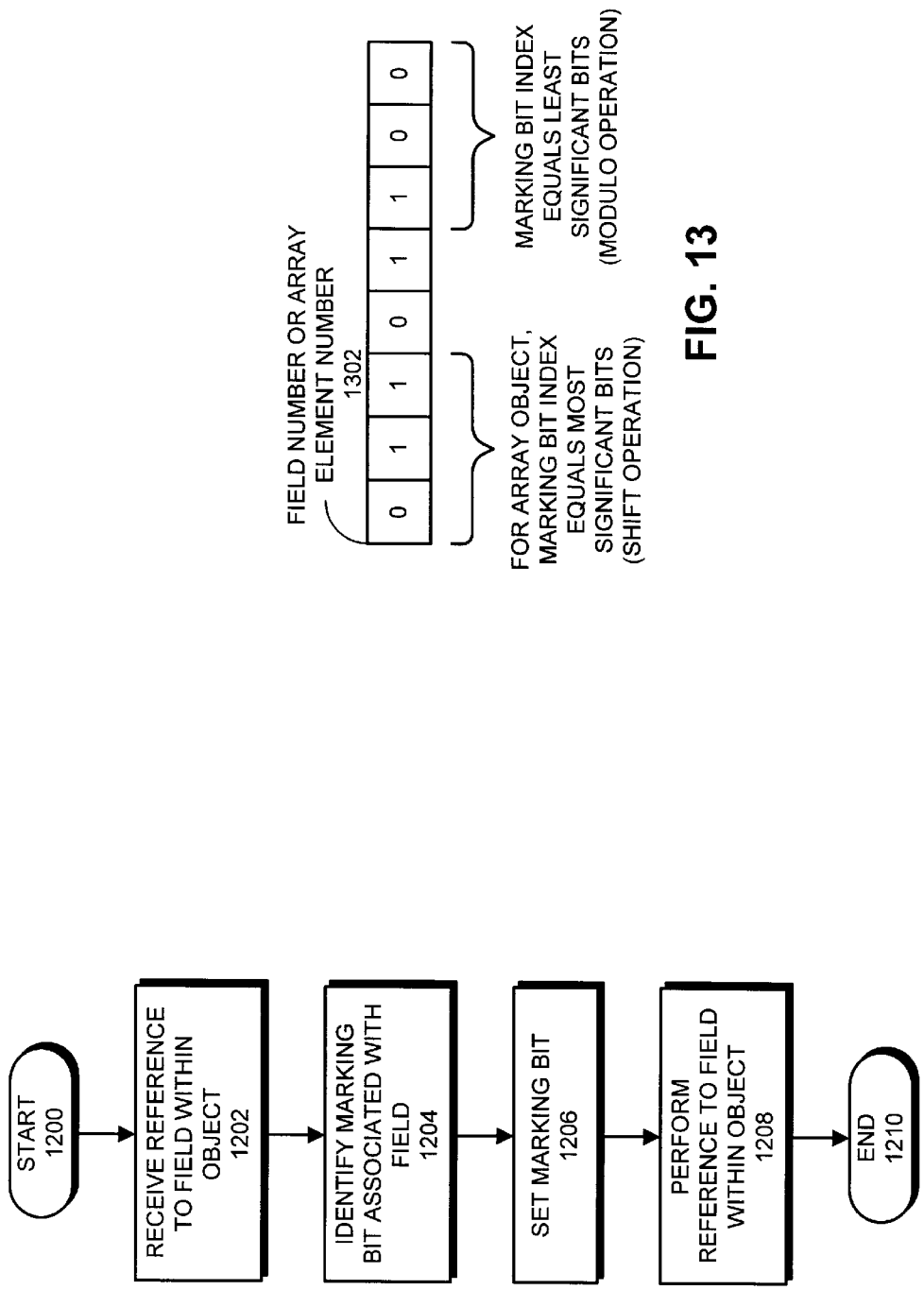

US 6,453,463 B1

METHOD AND APPARATUS FOR PROVIDING FINER MARKING GRANULARITY FOR FIELDS WITHIN OBJECTS

Related Application

This application is related to the subject matter in a pending U.S. patent application, entitled "Supporting Space-Time Dimensional Program Execution by Selectively Versioning Memory Updates," by inventors Shailender Chaudhry and Marc Tremblay, having Ser. No. 09/313,229 and a filing date of May 17, 1999.

The subject matter of this application is also related to the subject matter in a co-pending non-provisional application by the same inventor(s) as the instant application and filed on the same day as the instant application entitled, "Using Time Stamps to Improve Efficiency in Marking Fields Within Objects," having Ser. No. 09/327,399, and filing date Jun. 7, 1999.

BACKGROUND

1. Field of the Invention

The present invention relates to performance enhancements in object-oriented programming systems. More specifically, the present invention relates to a method and an apparatus that supports finer marking granularity for fields within objects defined within an object-oriented programming system.

2. Related Art

As increasing semiconductor integration densities allow more transistors to be integrated onto a microprocessor chip, computer designers are investigating different methods of using these transistors to increase computer system performance Some recent computer architectures exploit "instruction level parallelism," in which a single central processing unit (CPU) issues multiple instructions in a single cycle. Given proper compiler support, instruction level parallelism has proven effective at increasing computational performance across a wide range of computational tasks. However, inter-instruction dependencies generally limit the performance gains realized from using instruction level parallelism to a factor of two or three.

Another method for increasing computational speed is "speculative execution" in which a processor executes multiple branch paths simultaneously, or predicts a branch, so that the processor can continue executing without waiting for the result of the branch operation. By reducing dependencies on branch conditions, speculative execution can increase the total number of instructions issued.

Unfortunately, conventional speculative execution typically provides a limited performance improvement because only a small number of instructions can be speculatively executed. One reason for this limitation is that conventional speculative execution is typically performed at the basic block level, and basic blocks tend to include only a small number of instructions. Another reason is that conventional hardware structures used to perform speculative execution can only accommodate a small number of speculative instructions.

What is needed is a method and apparatus that facilitates speculative execution of program instructions at a higher level of granularity so that many more instruct ions can be speculatively executed.

One challenge in designing a system that supports speculative execution is to detect a rollback condition. A rollback condition can occur in a number of situations. For example, a rollback condition occurs when a speculative thread that is executing program instructions in advance of a head thread reads from a memory element before the head thread performs a write to the memory element. In this case, the speculative thread must "rollback" so that it can read the value stored by the head thread. A rollback condition can be detected by "marking" memory elements as they are read by the speculative thread so that the head thread can subsequently determine if the memory elements have been read by the speculative thread. Unfortunately, using a separate marking indicator for each memory element can consume a large amount of memory, which can reduce cache hit rates arid thereby degrade system performance.

What is needed is a method and an apparatus for marking memory elements that does require a large amount of memory for storing marking indicators.

SUMMARY

One embodiment of the present invention provides a system that facilitates marking of objects defined within an object-oriented programming system to keep track of accesses to fields within the objects. The system operates by receiving a reference to a field within an object, and identifying a marking bit within the object that is associated with the field. Note that each marking bit within the object is associated with a different subset of fields within the object. Next, the system sets the marking bit to indicate that at least one field within the associated subset of fields has been referenced. Finally, the system performs the reference to the field.

In one embodiment of the present invention, the object includes N marking bits numbered 0, 1, 2, ..., N−1 and M fields numbered 0, 1, 2, ..., M−1. In this embodiment, the system identifies the marking bit associated with the field by starting with a field number for the field, and applying a modulo N operation to the field number to produce a number for the associated marking bit. In a variation on this embodiment, N is a power of two.

In one embodiment of the present invention, the system supports space and time dimensional execution. To this end, the system supports a head thread that executes program instructions and a speculative thread that executes program instructions in advance of the head thread. The head thread accesses a primary version of the object and the speculative thread accesses a space-time dimensioned version of the object. In this embodiment, the steps of identifying the marking bit and setting the marking bit take place for a read operation by the speculative thread.

In a variation on this embodiment, there exists a separate set of marking bits for write operations. In this variation, if the reference is a write operation by the speculative thread, the steps of identifying the marking bit and setting the marking bit involve the separate set of marking bits. Upon a subsequent write operation to the field by the head thread, the head thread writes to both the primary version and the space-time dimensioned version if the marking bit is unset, and otherwise writes to the primary version.

In one embodiment of the present invention, during a subsequent write, operation to the field by the head thread, the system determines if the marking bit associated with the field has been set by executing a special bit extract instruction to examine the marking bit.

In one embodiment of the present invention, if the object is an array object with N marking bits numbered 0, 1, 2, ..., N−1 and M array elements numbered 0, 1, 2, ..., M−1, the step of identifying the marking bit that is associated with the field includes identifying an array index for an array element, and dividing the array index by the ceiling of M/N to produce a number for the associated marking bit. In a variation on this embodiment, the ceiling of M/N is a power of two. Hence, the division operation can be accomplished by shifting the array index so that the moss significant bits of the array index become the number for the associated marking bit.

In one embodiment of the present invention, if the reference involves a block transfer operation, the system determines if the block transfer operation touches array elements associated with multiple marking bits, and if so sets the multiple marking bits.

In one embodiment of the present invention, the system resets marking bits within the object after a subsequent join operation or rollback operation. In a variation on this embodiment, this resetting occurs during a subsequent setting of a marking bit after the subsequent join operation or rollback operation.

In one embodiment of the present invention, all marking bits within the object are contained in a single word of memory that additionally contains a time stamp.

BRIEF DESCRIPTION OF THE FIGURES

FIG. 10 is a flow chart illustrating operations involved in performing a join between a head thread and a speculative thread in accordance with an embodiment of the present invention.

FIG. 11 is a flow chart illustrating operations involved in performing a join between a head thread and a speculative thread in accordance with another embodiments of the present invention.

FIG. 12 is a flow chart illustrating the process of setting a marking bit associated with a referenced field within an object in accordance with an embodiment of the present invention.

FIG. 13 illustrates how a marking bit number can be determined from a field number or an array element number in accordance with an embodiment of the present invention.

DETAILED DESCRIPTION

The following description is presented to enable any person skilled in the art to make id use the invention, and is provided in the context of a particular application and its requirements. Various modifications to the disclosed embodiments, will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a carrier wave. For example, the carrier wave may carry information across a communications network, such as the Internet.

Computer System

Figure 1:
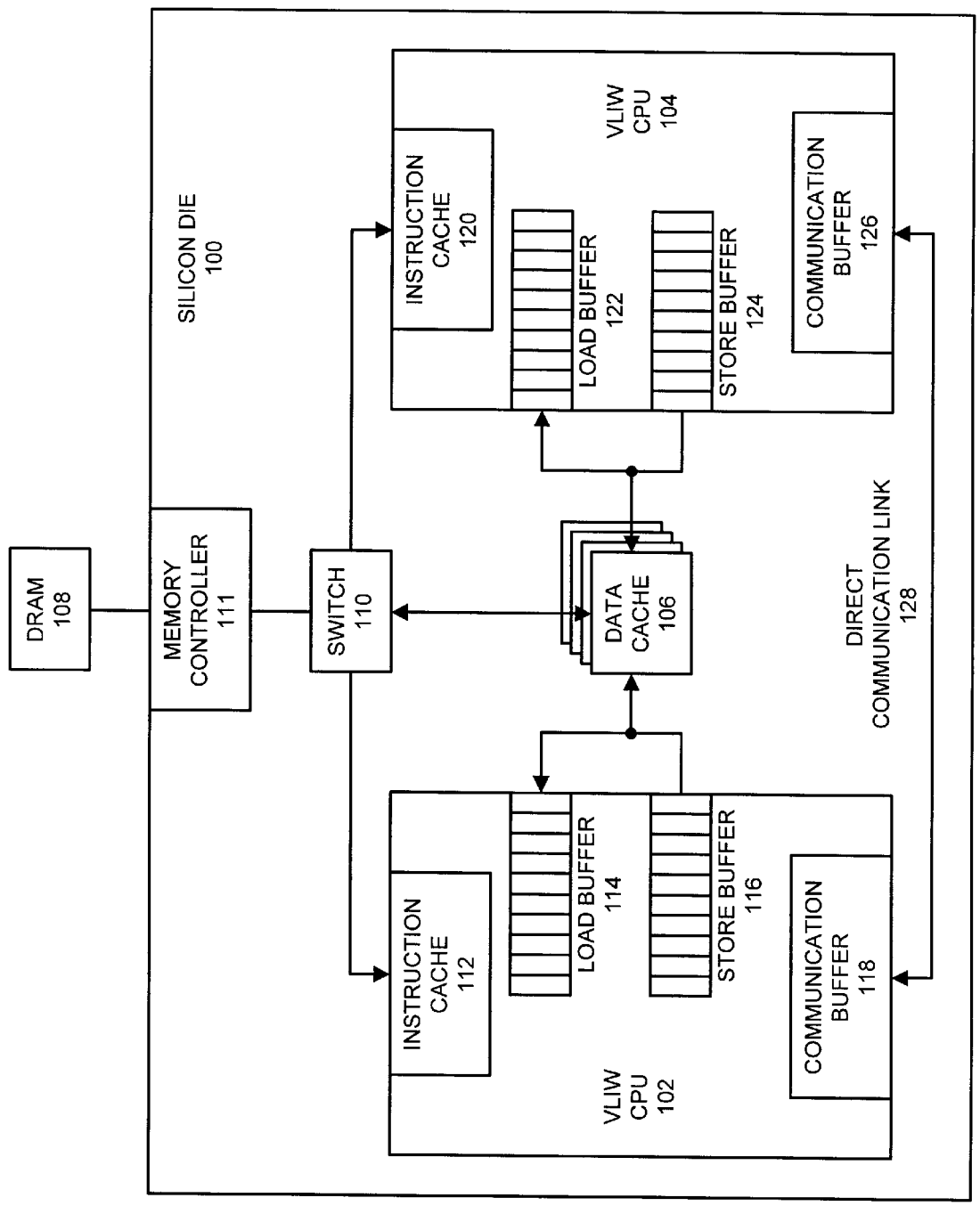
FIG. 1 illustrates a computer system including two central processing units sharing a common data cache in accordance with an embodiment of the present invention.

FIG. 1 illustrates a computer system including two central processing units (CPUS) 102 and 104 sharing a common data cache 106 in accordance with an embodiment of the present invention. In this embodiment, CPUs 102 and 104 and data cache 106 reside on silicon die 100. Note that CPUs 102 and 104 may generally be any type of computational devices that allow multiple threads to execute concurrently. In the embodiment illustrated in FIG. 1, CPUs 102 and 104 are very long instruction word (VLIW) CPUs, which support concurrent execution of multiple instructions executing on multiple functional units. VLIW CPUs 102 and 104 include instruction caches 112 and 120, respectively, containing instructions to be executed by VLIW CPUs 102 and 104.

VLIW CPUs 102 and 104 additionally include load buffers 114 and 122 as well as store buffers 116 and 124 for buffering communications with data cache 106. More specifically, VLIW CPU 102 includes load buffer 114 for buffering loads received from data cache 106, and store buffer 116 for buffering stores to data cache 106. Similarly, VLIW CPU 104 includes load buffer 122 for buffering loads received from data cache 106, and store buffer 124 for buffering stores to data cache 106.

VLIW CPUs 102 and 104 are additionally coupled together by direct communication link 128, which facilitates rapid communication between VLIW CPUs 102 and 104. Note that direct communication link 128 allows VLIW CPU 102 to write into communication buffer 126 within VLIW CPU 104. It also allows VLIW CPU 104 to write into communication buffer 118 within VLIW CPU 102.

In the embodiment illustrated in FIG. 1, Data cache 106 is fully dual-ported allowing concurrent read and/or write accesses from VLIW CPUs 102 and 104. This dual porting eliminates cache coherence delays associated with conventional shared memory architectures that rely on coherent caches.

In one embodiment of the present invention, data cache 106 is a 16 K byte 4-way set-associative data cache with 32 byte cache lines.

Data cache 106, instruction caches 112 and instruction cache 120 are coupled through switch 110 to memory controller 111. Memory controller 111 is coupled to dynamic random access memory (DRAM) 108, which is located off chip. Switch 110 may include any type of circuitry for switching signal lines. In one embodiment of the present invention, switch 110 is a cross bar switch.

The present invention generally applies to any computer system that supports con current execution by multiple threads and is not limited to the illustrated computing system. However, note that data cache 106 supports fast accesses to shared data items. These fast accesses facilitate efficient sharing of status information between VLIW CPUs 102 and 104 to keep track of accesses to versions of memory objects.

Space-Time Dimensional Execution of Methods

Figure 2A:
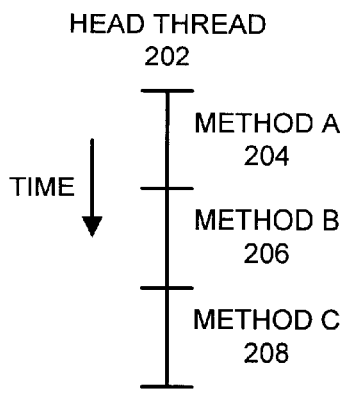
FIG. 2A illustrates sequential execution of methods by a single thread.

FIG. 2A illustrates sequential execution of methods in a conventional computer system by a single head thread 202. In executing a program, head thread 202 executes a number of methods in sequence, including method A 204, method B 206 and method C 208.

Figure 2B:
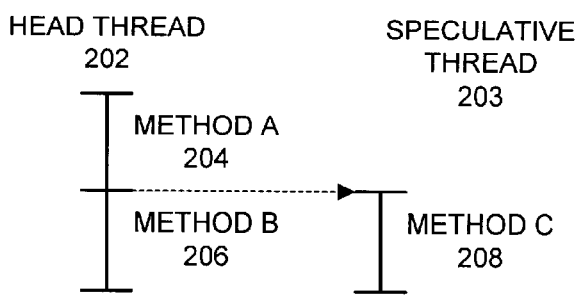
FIG. 2B illustrates space and time dimensional execution of a method in accordance with an embodiment of the present invention.

In contrast, FIG. 2B illustrates space and time dimensional execution of a method in accordance with an embodiment of the present invention. In FIG. 2B, head thread 262 first executes method A 204 and then executes method B 206. (For this example, assume that method B 206 returns a void or some other value that is not used by method C 208. Alternatively, if method C 208 uses a value returned by method B 206, assume that method C 208 uses a predicted return value from method B 206.)

As bead thread 202 executes method B 206, speculative thread 203 executes method C 208 in a separate space-time dimension of the heap. If head thread 202 successfully executes method B 206, speculative thread 203 is joined with head thread 202. This join operation involves causing state associated with the speculative thread 203 to be merged with state associated with the head thread 202 and the collapsing of the space-time dimensions of the heap.

If speculative thread 203 for some reason encounters problems in executing method C 208, speculative thread 203 performs a rollback operation. This rollback operation allows speculative thread 203 to reattempt to execute method C 208. Alternatively, head thread 202 can execute method C 208 non-speculatively and speculative thread 203 can execute a subsequent method.

There are a number of reasons why speculative thread 203 may encounter problems in executing method C 208. One problem occurs when head thread 202 executing method B 206 writes a value to a memory element (object) after speculative thread 203 has read the same memory element. The same memory element can be read when the two space-time dimensions of the heap are collapsed at this memory element at the time of the read by speculative thread 203. In this case, speculative thread 203 should have read the value written by head thread 202, but instead has read a previous value. In this case, the system causes speculative thread 203 to roll back so that speculative thread 203 can read the value written by head thread 202.

Note that the term "memory element" generally refers to any unit of memory that can be accessed by a computer program. For example, the term "memory element" may refer to a bit, a byte or a word memory, as well as a data structure or an, object defined within an object-oriented programming system.

Figure 3:
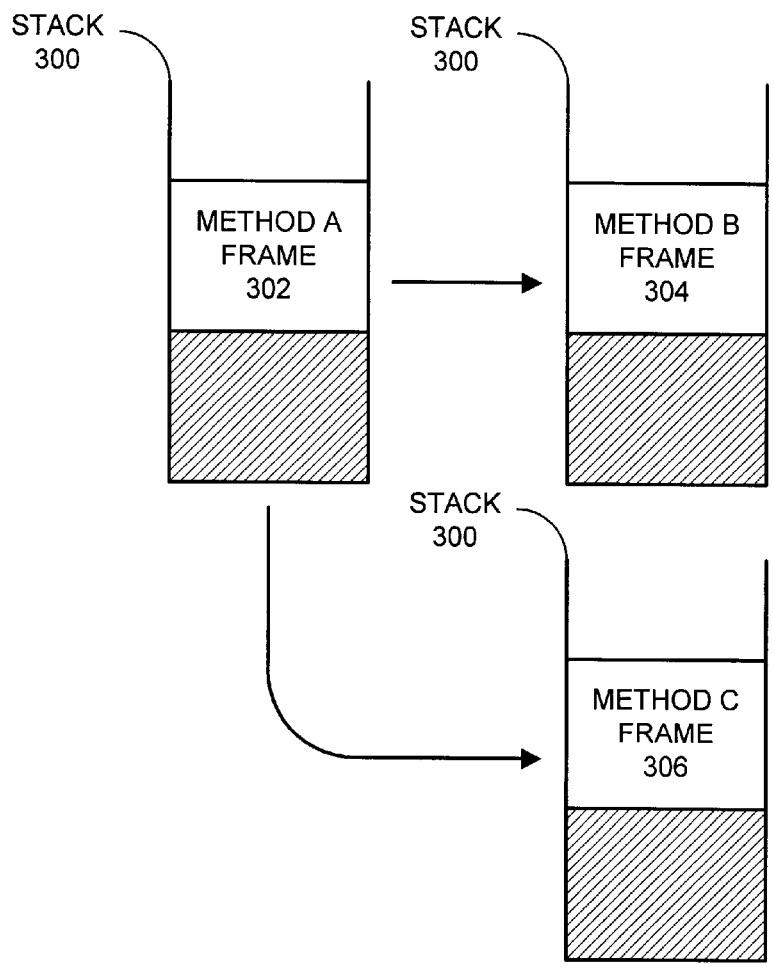
FIG. 3 illustrates the state of the system stack during space and time dimensional execution of a method in accordance with an embodiment of the present invention.

FIG. 3 illustrates the state of the system stack during space and time dimensional execution of a method in accordance with an embodiment of the present invention. Note that since programming languages such as the Java programming language do not allow a method to modify the stack frame of another method, the system stack will generally be the same before method B 206 is executed as it is before method C 208 is executed. (This is not quite true if method B 206 returns a parameter through the system stack. However, return parameters are can be explicitly dealt with as is described below.) Referring the FIG. 3, stack 300 contains method A frame 302 while method A 204 is executing. When method A 204 returns, method B 206 commences and method A frame 302 is replaced by method B frame 304. Finally, when method B 206 returns, method C 208 commences and method B frame 304 is replaced by method C frame 306. Note that since stack 300 is the same immediately before method B 206 executed as it is immediately before method C 208 is executed, it is possible to execute method C 208 using a copy of stack 300 without first executing method B 206.

In order to undo the results of speculatively executed operations, updates to memory need to be versioned. The overhead involved in versioning all updates to memory can be prohibitively expensive due to increased memory requirements, decreased cache performance and additional hardware required to perform the versioning.

Fortunately, not all updates to memory need to be versioned. For example, updates to local variables—such as a loop counter—on a system stack are typically only relevant to the thread that is updating the local variables. Hence, even for speculative threads versioning updates to these local variables is not necessary.

When executing programs written in conventional programming languages, such as C, it is typically not possible to determine which updates are related to the heap, and which updates are related to the system stack. These programs e typically compiled from a high-level language representation into executable code for a specific machine architecture. This compilation process typically removes distinctions between updates to heap and system stack.

The same is not true for new platform-independent computer languages, such as the JAVA™ programming language distributed by SUN Micro systems, Inc. of Palo Alto, Calf. (Sun, the Sun logo, Sun Micro systems, and Java are trademarks or registered trademarks of Sun Micro systems, Inc. in the United States and other countries.) A program written in the Java programming language is typically compiled into a class file containing Java byte codes. This class file can be transmitted over a computer network to a distant computer system to be executed on the distant computer system. Java byte codes are said to be "platform-independent," because they can be executed across a wide range of computing platforms, so long as the computing platforms provide a Java virtual machine.

A Java byte code can be executed on a specific computing platform by using an interpreter or a just in time (JIT) compiler to translate the Java byte code into machine code for the specific computing platform. Alternatively, a Java byte code can be executed directly on a Java byte code engine running on the specific computing platform.

Fortunately, a Java bytecode contains more syntactic information than conventional machine code. In particular, the Java bytecodes differentiate between accesses to local variables in the system stack and accesses to the system heap. Furthermore, programs written in the Java programming language do not allow conversion between primitive and reference types. Such conversion can make it hard to differentiate accesses to the system stack from accesses to the system heap at compile time.

Data Structures to Support Space-Time Dimensional Execution

Figure 4:
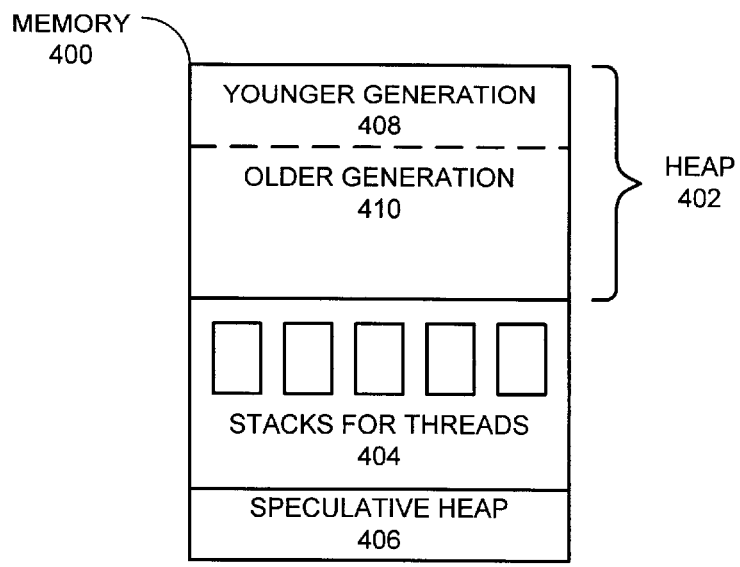
FIG. 4 illustrates how memory is partitioned between stack and heap in accordance with an embodiment of the present invention.
Figure 5:
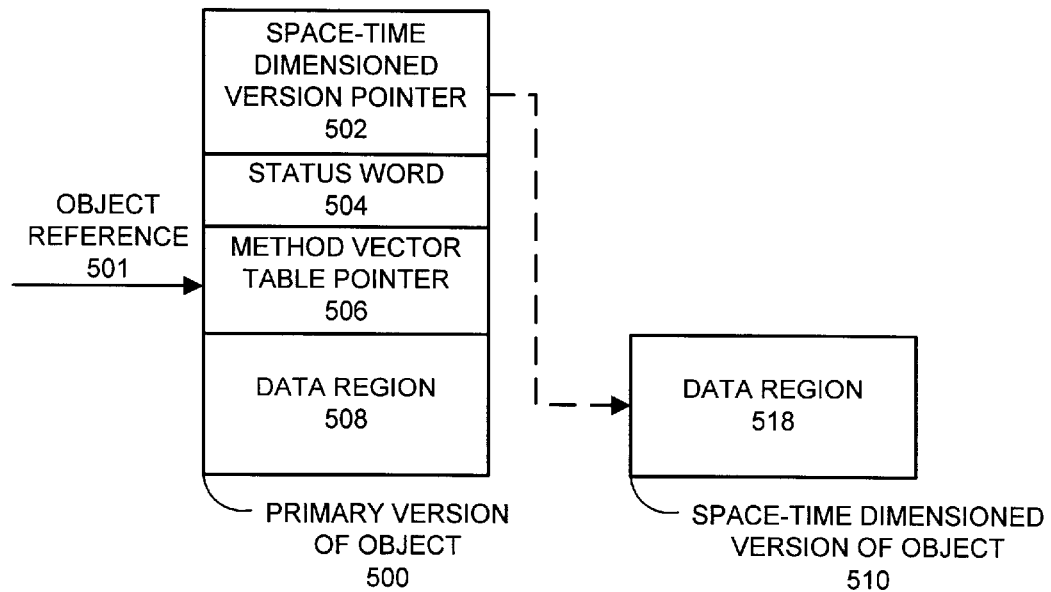
FIG. 5 illustrates the structure of a primary version and a space-time dimensioned version of an object in accordance with an embodiment of the present invention.

FIG. 4 illustrates how memory is partitioned between stack and heap in accordance with an embodiment of the present invention. In FIG. 4, memory 400 is divided into a number of regions including heap 402, stacks for threads 404 and speculative heap 406. Heap 402 comprises a region of memory from which objects are allocated. Heap 402 is further divided into younger generation region 408 and older generation region 410 for garbage collection purposes. For performances reasons, garbage collectors typically treat younger generation objects differently from older generation objects. Stack for threads 404 comprises a region of memory from which stacks for various threads are allocated. Speculative heap 406 contains the space-time dimensioned values of all memory elements where the two space-time dimensions of the heap are not collapsed. This includes space-time dimensional versions of objects, for example, version 510 of object 500 as shown in FIG. 5, and objects created by speculative thread 203. For garbage collection purposes, these objects created by speculative thread 203 can be treated as belonging to a generation that is younger than objects within younger generation region 408.

FIG. 5 illustrates the structure of a primary version of object 500 and a space-time dimensioned version of object 510 in accordance with an embodiment of the present invention.

Primary version of object 500 is referenced by object reference pointer 501. Like any object defined within an object-oriented programming system, primary version of object 500 includes data region 508, which includes one or more fields containing data associated with primary version of object 500. Primary version of object 500 also includes method vector table pointer 506. Method vector table pointer 506 points to a table containing vectors that point to the methods that can be invoked on primary version of object 500.

Primary version of object 500 also includes space-time dimensioned version pointer 502, which points to space-time dimensioned version of object 510, if the two space-time dimensions are not collapsed at this object. Note that in the illustrated embodiment of the present invention, space-time dimensioned version 51 is always referenced indirectly through space-time dimensioned version pointer 502. Primary version of object 500 additionally includes status word 504, which contains status information specifying which fields from data region 508 have been written to or read by speculative thread 203. Space-time dimensioned version of object 510 includes only data region 518.

Figure 6:
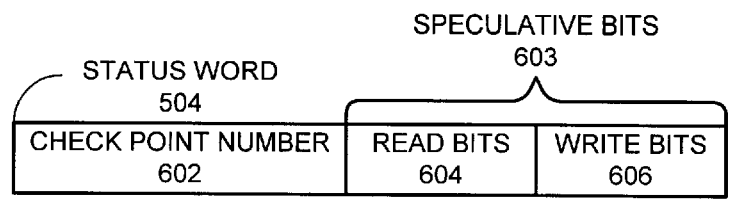
FIG. 6 illustrates the structure of a status word for an object in accordance with an embodiment of the present invention.

FIG. 6 illustrates the structure of status word 504 in accordance with an embodiment of the present invention. In this embodiment, status word 504 includes checkpoint number 602 and speculative bits 603. Speculative bits 603 includes read bits 604 and write bits 606. When status word 504 needs to be updated due to a read or a write by speculative thread 203, checkpoint number 602 is updated with the current time of the system. The current time in the time dimension of the system is advanced discretely at a join or a rollback. This allows checkpoint number 602 to be used as a qualifier for speculative bits 603. If checkpoint number 602 is less than the current time, speculative bits 603 can be interpreted as reset.

Read bits 604 keep track of which fields within data region 508 have been read since the last join or rollback. Correspondingly, write bits 606 keep track of which fields within data region 508 have been written since the last join or rollback. In one embodiment of the present invention, read bits 604 includes one bit for each field within data region 508. In another embodiment, read bits includes fewer bits than the number of fields within data region 508. In this embodiment, each bit within read bits 604 corresponds to more than one field in data region 508. For example, if there are eight read bits, each bit corresponds to every eighth field. Write bits 606 similarly can correspond to one or multiple fields within data region 508.

Space-Time Dimensional Update Process

Space-time dimensioning occurs during selected memory updates. For local variable and operand accesses to the system stack, no space-time dimensioned versions exist and nothing special happens. During read operations by head thread 202 to objects in the heap 402, again nothing special happens.

Special operations are involved in write operations by head thread 202 as well as read and write operations by speculative thread 203. These special operations are described in more detail with reference to FIGS. 7, 8 and 9 below.

Figure 7:
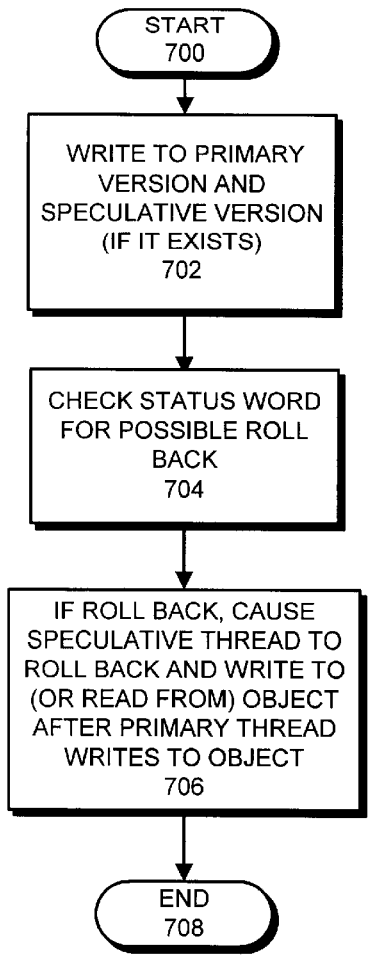
FIG. 7 is a flow chart illustrating operations involved in performing a write to a memory element by a head thread in accordance with an embodiment of the present invention.

FIG. 7 is a flow chart illustrating operations involved in a write operation to an object by a head thread 202 in accordance with an embodiment of the present invention. The system writes to the primary version of object 500 and the space-time dimensioned version of object 510 if the two space-time dimensions are not collapsed at this point (step 702). Next, the system checks status word 504 within primary version of object 500 to determine whether a rollback is required (step 704). A rollback is required if speculative thread 203 previously read the data element. The same memory element can be read when the two space-time dimensions of the heap are collapsed at this memory element at the time of the read by speculative thread 203. A rollback is also required if speculative thread 203 previously wrote to the object and thus ensured that the two dimensions of the object are not collapsed at this element, and if the current write operation updates both primary, version of object 500 and space-time dimensioned version of object 510.

If a rollback is required, the system causes speculative thread 203 to perform a rollback operation (step 706). This rollback operation allows speculative thread 203 to read from (or write to) the object after head thread 202 writes to the object.

Note that in the embodiment of the present invention illustrated in FIG. 7 the system performs writes to both primary version 500 and space-time dimensioned version 510. In an alternative embodiment, the system first checks to determine if speculative thread 203 previously wrote to space-time dimensioned version 510. If not, the system writes to both primary version 500 and space-time dimensioned version 510. If so, the system only writes to primary version 500.

Figure 8:
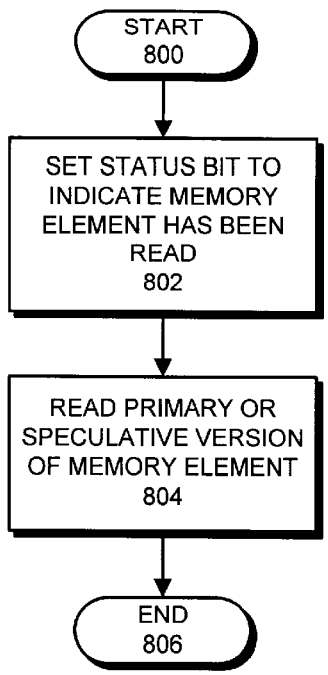
FIG. 8 is a flow chart illustrating operations involved in performing a read to a memory, element by a speculative thread in accordance with an embodiment of the present invention.

FIG. 8 is a flow chart illustrating operations involved in a read operation to an object by speculative thread 203 in accordance with an embodiment of the present invention. During this read operation, the system sets a status bit in status word 504 within primary version of object 500 to indicate that primary version 500 has been read (step 802). Speculative thread 203 then reads space-time dimensioned version 510, if it exists. Otherwise, speculative thread 203 reads primary version 500.

Figure 9:
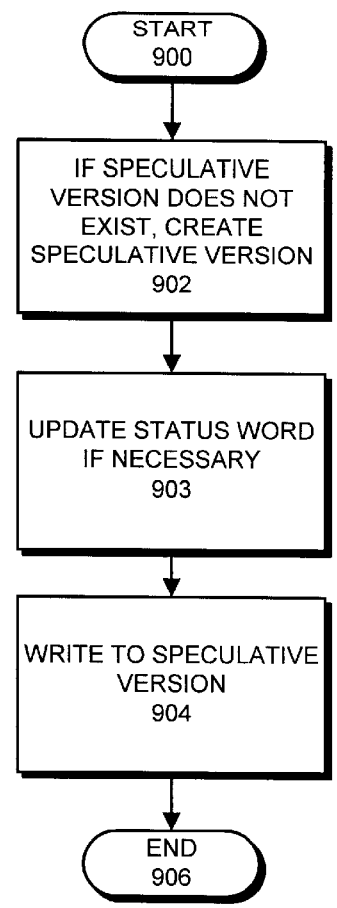
FIG. 9 is a flow chart illustrating operations involved in performing a write to a memory element by a speculative thread in accordance with an embodiment of the present invention.

FIG. 9 is a flow chart illustrating operations involved in a write operation to a memory element by speculative thread 203 in accordance with an embodiment of the present invention. If a space-time dimensioned version 510 does not exist, the system creates a space-time dimensioned version 510 in speculative heap 406 (step 902). The system also updates status word 504 to indicate that speculative thread 203 has written to the object if such updating is necessary (step 903). The system next writes to space-time dimensioned version 510 (step 904). Such updating is necessary if head thread 202 must subsequently choose between writing to both primary version 500 and space-time dimensioned version 510 or writing only to primary version 500 as is described above with reference to FIG. 7.

FIG. 10 is a flow chart illustrating operations involved in a join operation between head thread 202 and a speculative thread 203 in accordance with an embodiment the present invention. A join operation occurs for example when head thread 202 reaches a point in the program where speculative thread 203 began executing. The join operation causes state associated with the speculative thread 203 to be merged with state associated with the head thread 202. This involves copying and/or merging the stack of speculative thread 203 into the stack of head thread 202 (step 1002). It also involves merging space-time dimension and primary versions of objects (step 1004) as well as possibly garbage collecting speculative heap 406 (step 1006). In one embodiment of the present invention, one of threads 202 or 203 performs steps 1002 and 1006, while the other thread performs step 1004.

FIG. 11 is a flow chart illustrating operations involved in a join operation between head thread 202 and a speculative thread 203 in accordance with another embodiment of the present invention. In this embodiment, speculative thread 203 carries on as a pseudo-head thread. As a pseudo-head thread, speculative thread 203 uses indirection to reference space-time dimensioned versions of objects, but does not mark objects or create versions. While speculative thread 203 is acting as a pseudo-head thread, head thread 202 updates primary versions of objects.

Extension to Additional Speculative Threads

Although the present invention has been described for the case of a single speculative thread, the present invention can be extended to provide multiple speculative threads operating on multiple space-time dimensioned versions of a data object in parallel.

Process of Setting Marking Bits

FIG. 12 is a flow chart illustrating the process of setting a marking bit associated with a referenced field within an object in accordance with an embodiment of the present invention. First, the system receives a reference to the field within the object (step 1202). This reference may be a read or a write operation. (Note that in the case of an array object the field is an array element.)

Next, the system identifies a marking bit associated with the field (step 1204). In one embodiment of the present invention, the system maintains a separate set of read marking bits 604 for the object to indicate that a read operation has occurred to the field, and a separate set of write marking bits 606 to indicate that a write operation has occurred to the field. In this embodiment, if the operation is a read operation, one of the read marking bits 604 is selected. Otherwise, one of the write marking bits 606 is selected.

In one embodiment of the present invention, the marking bit is identified by performing modulo operation. For example, if the object includes N marking bits numbered 0, 1, 2, ..., N−1 and M fields numbered 0, 1, 2, ..., M−1, the system starts with a field number for the field, and applies a modulo N operation to the field number to produce a number for the associated marking bit. This modulo operation can be efficiently performed if N is a power of two because the modulo operation reduces to a simple bit mask operation that isolates the lower order bits of the field number.

The selection a value of N for an object involves a tradeoff. If N is too small, there tends to be lot of aliasing and system performance suffers due to false rollbacks. If N is too large, a great deal of memory is used for marking bits which can cause cache performance to suffer. In one embodiment of the present invention, N=8. In another embodiment, N=16.

In the case of an array object, the system applies a division operation to the array element number (field number) to identify the associated array element. For example, if the array object has N marking bits numbered 0, 1, 2, ..., N−1 and M array elements numbered 0, 1, 2, ..., M−1, the step of identifying the marking bit includes dividing the array element number by the ceiling of M/N to produce a number for the associated marking bit. If the ceiling of M/N is a power of two, the division operation can be accomplished by shifting the array index so that the most significant bits of the array index become the number for the associated marking bits The above-described mapping between array elements and marking bits for array objects associates consecutive array locations with a single marking bit. This ensures that not all of the marking bits are set by common block copy operations involving only a portion of the array.

After the marking bit is identified, the marking bit is set (step 1206) and the reference is performed to the field (or array element) within the object (step 1208).

In general the marking mechanism according to the present invention can be used in any application that must keep track of accesses to fields within an object. However, in one embodiment of the present invention, marking is performed for read operations by speculative thread 203. In another embodiment, marking is performed to write bits 606 during a write operation by speculative thread 203 and to read bits 604 during a read operation by speculative thread 203.

After the marking bits have been set, if a head thread 202 subsequently performs a write operation to a field in the object, head thread 202 can identify the associated marking bit using the above-described modulo or division operations. Next, the marking bit is extracted for examination purposes using a special bit extract operation that is part of the instruction set of the underlying computer system.

FIG. 13 illustrates how a marking bit number can be determined from a field number or an array element number in accordance with an embodiment of the present invention. The system starts will a field number or an array element number 1302. In the case of a field number, the system performs a modulo operation by masking off all but the lower order three bits of field number 1302 to produce a three bit index (1,0,0) that specifies a marking bit. In the case of an array index, he system performs a division operation by shifting array element number 1302 until only the three most significant bits (0,1,1) remain.

Figure 14:
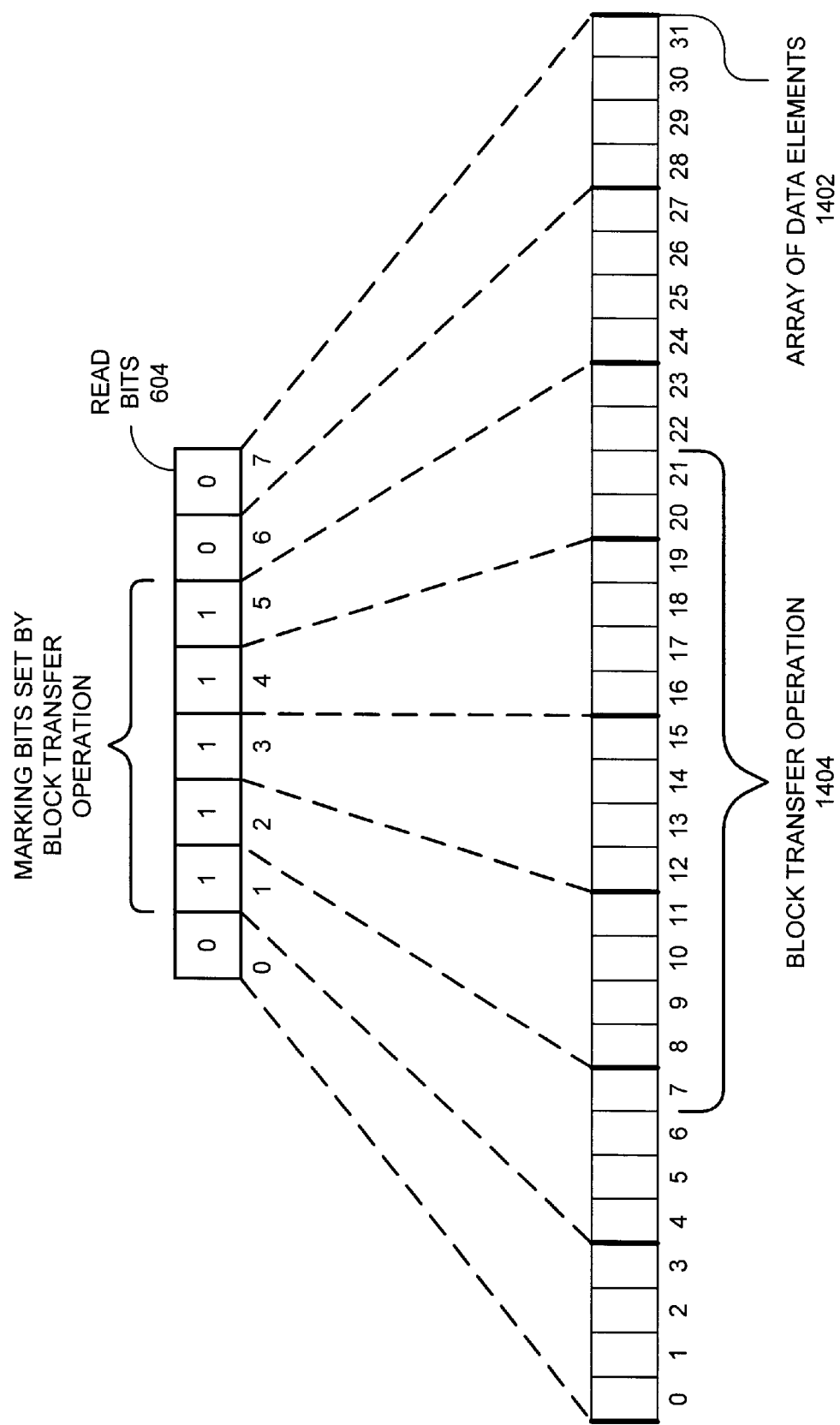
FIG. 14 illustrates how a block transfer operation can set multiple marking bits in accordance with an embodiment of the present invention.

FIG. 14 illustrates how a block transfer operation sets multiple marking bits in accordance with an embodiment of the present invention. The example illustrated in FIG. 14 includes an array of data elements 1402. These data elements are numbered 0, 1, 2, ..., 31. FIG. 14 also includes an array of read bits 604. These read bits are numbered 0, 1, 2, ..., 7. In the case of a block transfer operation 1404 that reads array elements seven through 21, the system first determines that read bits one through five must be set. Next, the system sets read bits one through five. Finally, the system performs the block transfer operation.

Note that a typical block transfer operation accesses consecutive array elements and hence sets a consecutive block of read bits. A shift operation can be used in combination with a special byte shuffle operation provided by the underlying machine architecture to efficiently set a consecutive block of read bits. For example, the byte shuffle operation can be used to wrap around bits that overflow from the shift operation.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for marking objects defined within an object-oriented programming system to keep track of accesses to fields within objects, wherein the method operates in a system that supports space and time dimensional execution, the system having a head thread that executes program instructions and a speculative thread that executes program instructions in advance of the head thread, the head thread accessing a primary version of the object and the speculative thread accessing a space-time dimensioned version of the object, comprising:

receiving a reference to a field within an object;

identifying a marking bit within the object that is associated with the field, each marking bit within the object being associated with a different subset of fields within the object;

setting the marking bit, wherein setting the marking bit indicates that at least one field within the associated subset of fields has been referenced; and performing the reference to the field within the object;

wherein the steps of identifying the marking bit and setting the marking bit take place for a read operation by the speculative thread.

2. The method of claim 1, wherein the object includes N marking bits numbered 0, 1, 2, ... , N−1 and M fields numbered 0, 1, 2, ... , M−1, and wherein identifying the marking bit associated with the field includes starting with a field number for the field, and applying a modulo N operation to the field number to produce a number for the associated marking bit.

3. The method of claim 2, wherein N is a power of two.

4. The method of claim 1, wherein there exists a separate set of marking bits for write operations, and wherein if the reference is a write operation by the speculative thread, the steps of identifying the marking bit and setting the marking bit involve the separate set of marking bits, so that upon a subsequent write operation to the field by the head thread, the head thread writes to both the primary version and the space-time dimensioned version if the marking bit is unset, and writes to only the primary version if the marking bit is set.

5. The method of claim 1, further comprising during a subsequent write operation to the field by the head thread, determining if the marking bit-associated with the field has been set by executing a special bit extract instruction to examine the marking bit.

6. The method of claim 1, wherein if the object is an array object with N marking its numbered 0, 1, 2, ... , N−1 and M array elements numbered 0, 1, 2, ... , M−1, the step of identifying the marking bit that is associated with the field includes identifying an array index for an array element, and dividing the array index by the ceiling of M/N to produce a number for the associated marking bit.

7. The method of claim 6, wherein the ceiling of M/N is a power of two and the division operation is accomplished by shifting the array index so that the most significant bits of the array index become the number for the associated marking bin.

8. The method of claim 6, wherein if the reference involves a block transfer operation, the method further determines if the block transfer operation touches array elements associated with multiple marking bits, and if so sets the multiple marking bits.

9. The method of claim 1, further comprising resetting marking bits within the object after a subsequent join operation or rollback operation.

10. The method of claim 9, wherein the resetting occurs as part of a write operation that sets the marking bit associated with the referenced field.

11. The method of claim 1, wherein all marking bits within the object are contained in a single word of memory that additionally contains a time stamp.

12. A method for marking objects defined within an object-oriented programming system to keep track of accesses to fields within objects, the method operating in a system that supports space and time dimensional execution, the system having a head thread that executes program instructions and a speculative thread that executes program instructions in advance of the head thread, the head thread accessing a primary version of the object and the speculative thread accessing space-time dimensioned version of the object, the method comprising:

receiving a reference to a field within an object, the reference being a read operation by the speculative thread;

identifying a marking bit within the object that is associated with the field, each marking bit within the object being associated with a different subset of fields within the object, wherein the object includes N marking bits numbered 0, 1, 2, ... , N−1 and M fields numbered 0, 1, 2, ... , M−1, wherein identifying the marking bit associated with the field includes starting with a field number for the field, and applying a modulo N operation to the field number to produce a number for the associated marking bit, and wherein N is a power of two;

setting the marking bit, wherein setting the marking bit indicates that at least one field within the associated subset of fields has been referenced;

performing the reference to the field within the object; and resetting marking bits within the object after a subsequent join operation or rollback, operation, wherein the resetting occurs during a subsequent setting of a marking bit after the subsequent join operation or rollback operation.

13. A computer readable storage medium storing instructions that when executed by a computer cause the computer to perform a method for marking objects defined within an object-oriented programming system to keep track of accesses to fields within objects, wherein the method operates in a system that supports space and time dimensional execution, the system having a head thread that executes program instructions and a speculative thread that executes program instructions in advance of the head thread, the head thread accessing a primary version of the object and the speculative thread accessing a space-time dimensioned version of the object, comprising:

receiving a reference to a field within an object;

identifying a marking bit within the object that is associated with the field, each marking bit within the object being associated with a different subset of fields within the object;

setting the marking bit, wherein setting the marking bit indicates that at least one field within the associated subset of fields has been referenced; and performing the reference to the field within the object;

wherein the steps of identifying the marking bit and setting the marking bit take place for a read operation by the speculative thread.

14. An apparatus for marking objects defined within an object-oriented programming system to keep track of accesses to fields within objects, comprising:

an operating system that supports space and time dimensional execution, the operating system supporting a head thread that executes program instructions and a speculative thread that executes program instructions in advance of the head thread, the head thread accessing a primary version of the object and the speculative thread accessing a space-time dimensioned version of the object;

a receiving mechanism that receives a reference to a field within an object;

an identification mechanism that identifies a marking bit within the object that is associated with the field, each marking bit within the object being associated with a different subset of fields within the object;

a receiving mechanism that sets the marking bit, wherein setting the marking bit indicates that at least one field within the associated subset of fields has been reference; and a referencing mechanism that references the field within the object;

wherein the identification mechanism and the setting mechanism are configured to operate during a read operation by the speculative thread.

15. The apparatus of claim 14, wherein the object includes N marking bits numbered 0, 1, 2, . . . , N−1 and M fields numbered 0, 1, 2, . . . , M−1, and wherein the identification mechanism starts with a field number for the field, and applies a modulo N operation to the field number to produce a number for the associated marking bit.

16. The apparatus of claim 15, wherein N is a power of two.

17. The apparatus of claim 14, further comprising a resetting mechanism that resets marking bits within the object after a subsequent join operation or rollback operation.

18. The apparatus of claim 17, wherein the resetting mechanism is configured to reset the marking bit during a subsequent setting of a marking bit after the subsequent join operation or rollback operation.

19. A computer readable storage medium containing a data structure that facilitates marking of objects to keep track of accesses to fields within objects by an operating system that supports space and time dimensional execution, the operating system supporting a head thread that executes program instructions and a speculative thread that executes program instructions in advance of the head thread, the head thread accessing a primary version of the object and the speculative thread accessing a space-time dimensioned version of the object the data structure comprising:

an object defined within an object-oriented programming system;

a data storage area within the object containing a plurality of fields for storing data;

an object header within the object; and a plurality of marking bits within the object header, each marking bit within the plurality of marking bits being associated with a different subset of the plurality of fields, wherein a marking bit being set indicates that at least one field in an associated subset of fields has been referenced during a memory operation;

wherein identifying the marking bit and setting the marking bit take place for a read operation by the speculative thread.

20. The computer readable storage medium containing the data structure of claim 21, wherein if there are N marking bits numbered 0, 1, 2, . . . , N−1 and M fields numbered 0, 1, 2, . . . , M−1, a field is associated with a marking bit by starting with a field number for the field, and applying a modulo N operation to the field number to produce a number for the associated marking bit.

21. The computer readable storage medium containing the data structure of claim 20, wherein N is a power of 2.

22. The computer readable storage medium containing the data structure of claim 19, wherein the plurality of marking bits and a check point number are contained within a single status word within the object header.

* * * * *

UNITED STATES PATENT AND TRADEMARK OFFICE
CERTIFICATE OF CORRECTION

PATENT NO.    : 6,453,463 B1
DATED         : September 17, 2002
INVENTOR(S)   : Shailender Chaudhry et al.

It is certified that error appears in the above-identified patent and that said Letters Patent is hereby corrected as shown below:

<u>Column 13,</u>
Line 39, please delete the word, "receiving" and replace with the word -- setting --.

Signed and Sealed this

Twenty-fourth Day of December, 2002

JAMES E. ROGAN
*Director of the United States Patent and Trademark Office*